United States Patent Office 3,274,750
Patented Sept. 27, 1966

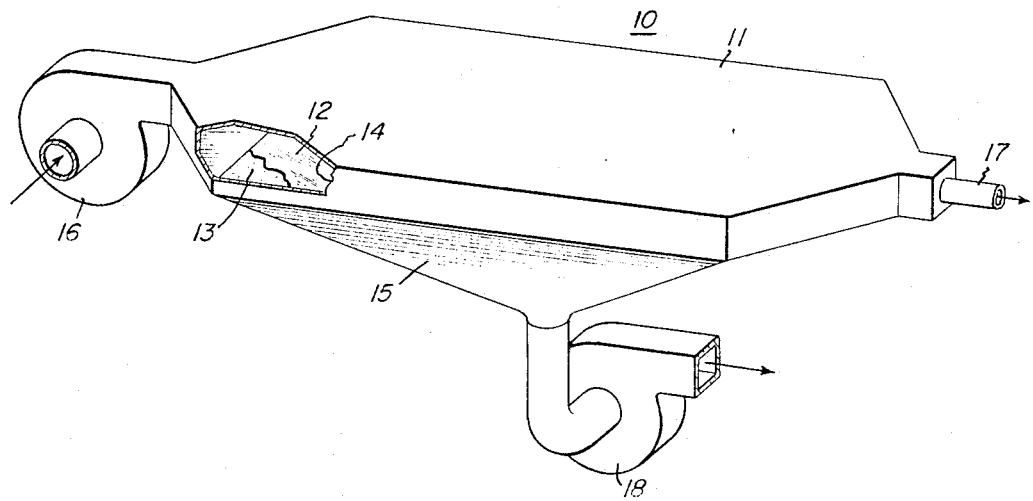
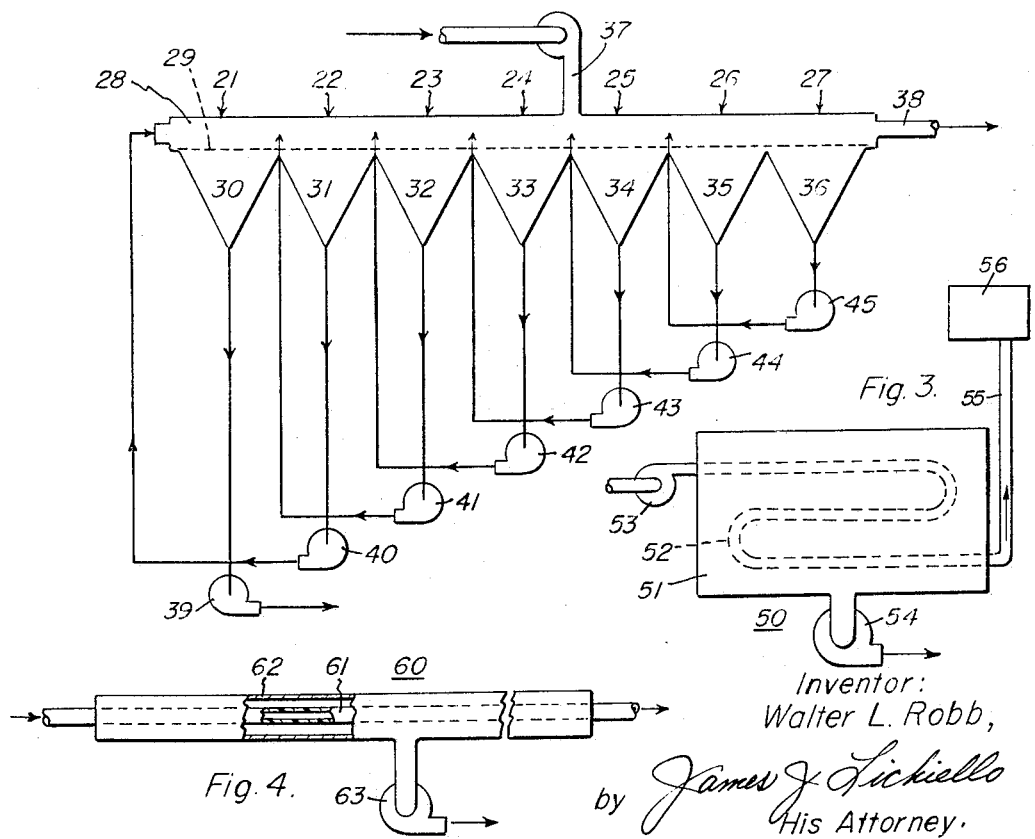

---

3,274,750
PERMEABLE POLYMERIC MEMBRANE GAS SEPARATION
Walter L. Robb, Scotia, N.Y., assignor to General Electric Company, a corporation of New York
Filed Dec. 28, 1962, Ser. No. 247,904
4 Claims. (Cl. 55—16)

This invention relates to gas separation by means of thin permeable films or membranes of silicone rubber, and more particularly to the use of these films in a method for the separation of such gases as nitrogen, zenon, krypton, and oxygen from specific mixtures of gases containing these and other gases.

Nitrogen appears in various gas mixtures from which it is desirable to remove a nitrogen enriched gas or to provide gases which are substantially depleted in nitrogen. Gaseous nitrogen may be desirable for some uses in varying amounts, at relatively low purity, at remote locations, etc., all of which may not economically warrant prior nitrogen separation processes and apparatus involving distillation, low temperatures, charcoal adsorption, etc. In some instances, a gas mixture which includes nitrogen, also includes gases such as xenon and krypton which are difficult to separate from the mixture except by relatively complex and uneconomical processes so that the separation is not undertaken. A separator method and apparatus which is preferentially permeable to xenon, krypton and oxygen may thus provide a gas enriched in xenon, krypton, or oxygen, or a gas enriched in nitrogen.

Accordingly, it is an object of this invention to provide an improved gas separation process.

It is another object of this invention to provide a method for the recovery of xenon and krypton from a gas mixture.

It is another further object of this invention to provide an improved separator device which utilizes thin films of silicone rubber to separate xenon and krypton from gas mixtures containing essentially zenon, krypton and nitrogen.

It is another object of this invention to provide an improved nitrogen separation process incorporating permeability of gases through thin silicone rubber films.

It is a further object of this invention to provide a separating device utilizing thin permeable films of silicone rubber to separate nitrogen from air to produce a product enriched in either nitrogen or oxygen.

Briefly described, this invention includes the utilization of a thin permeable silicone rubber film as a barrier means and exposing one side of the film to a specific mixture of gases in which the permeability of, for example, nitrogen is substantially different from the permeability of the remaining gases. Therefore, a gas is recovered from one or the other side of the film barrier which is either enriched in nitrogen or substantially depleted in nitrogen.

This invention will be better described when taken in connection with the following specification and the drawings in which:

FIG. 1 is a schematic illustration of an exemplary apparatus utilizing a thin silicone rubber film barrier;

FIG. 2 is a schematic illustration of an apparatus for the practice of this invention and utilized to separate nitrogen from a mixture of krypton, xenon, and nitrogen;

FIG. 3 is a modification of the invention of FIG. 1; and

FIG. 4 is a further modification of the invention of FIG. 1.

A primary example of the applicability of this invention refers to certain electrical power generating stations utilizing a boiling water nuclear reactor and requiring periodic removal of some of the noncondensable gases from the steam circuit. These gases consist primarily of hydrogen and oxygen from the radiolytic decomposition of water, xenon and krypton which have diffused from the fuel elements, and also air which has leaked into the steam system. Xenon and krypton are considered to be radioactive fission products, and as these power stations are constructed nearer to populated areas, the mentioned gases may necessarily need be stored for several days or months in order to provide the shorter lived isotopes time for proper decay. In order to minimize the required storage volume a process is desirable which will provide for the separation of xenon and krypton particularly from the bulk of the off gases.

It has been discovered that thin films of silicone rubber are selectively permeable to specific gases. For example, thin films of silicone rubber are more permeable with respect to xenon or krypton than to nitrogen, oxygen or hydrogen. However, oxygen and hydrogen can be easily removed from a gas mixture containing xenon, krypton and nitrogen by simple chemical methods which do not suffice to remove nitrogen. Therefore it is of particular interest to provide for the separation of nitrogen from a mixture of gases consisting essentially of xenon, krypton and nitrogen.

The room temperature permeability of thin silicone rubber films to various gases is given in the following Table 1:

TABLE 1

| Gas | $Pr\dfrac{(std. cc.)(cm.)}{(sec.)(cm.^2)(cm.\ Hg\ \Delta p)}$ |
|---|---|
| Xenon | $203 \times 10^{-9}$ |
| Krypton | $98 \times 10^{-9}$ |
| Hydrogen | $65 \times 10^{-9}$ |
| Oxygen | $59 \times 10^{-9}$ |
| Nitrogen | $28 \times 10^{-9}$ |
| Water vapor | $3,800 \times 10^{-9}$ |

In the formula of Table 1, (std. cc.) is a volume of the permeating gas at standard conditions, cm. is the thickness of the membrane, sec. is the time in seconds for a given amount of gas to be permeated, cm.$^2$ is the area of the membrane, and cm. Hg $\Delta p$ is the pressure difference across the membrane in centimeters of mercury.

The term "silicone rubber" as generally understood and employed herein refers to the homopolymeric dialkylsiloxanes and copolymers of dialkylsiloxane and siloxanes of the type RR′SiO where R is a monocyclic aryl radical and R′ is alkyl or monocyclic aryl. The alkyl group is preferably methyl, but may include other silicon-bonded groups, e.g., vinyl, phenyl, ethyl, etc., organic groups. Among the most common silicone rubbers are the polymers chemically defined as dimethyl polysiloxanes having the formula $[(CH_3)_2SiO]_n$ where $n$ is an integer above 500 and wherein the polymer has the characteristics of curing into a solid, rubber-like material having an average molecular weight of as high as 500,000 or more.

As one example, silicone rubber in accordance with this invention is conventionally manufactured by the condensation and polymerization of octamethyl cyclotetrasiloxane with an alkaline catalyst, such as potassium hydroxide to give polysiloxanes having the . . . —(CH$_3$)$_2$Si—O—Si(CH$_3$)$_2$—O—Si(CH$_3$)$_2$— . . .

siloxane chain.

Other examples of silicone rubber can be found in U.S. Patents 2,448,756—Agens, 2,445,794—Marsden, and 2,883,366—Kantor. The elastomer is then milled with an organic filler such as finely divided silica on mixing rolls, as is done with natural or synthetic rubber. A curing catalyst such as benzoyl peroxide, is added during the mixing, and the plastic mass is then molded to the desired shape and thickness, and is cured to an insoluble infusible elastic material.

The measurements of permeabilities of the various gases through silicone rubber are obtained by simple tests and calculations. For the permeability determination of this invention, a silicone rubber membrane is clamped in a simple permeation cell where both sides of the membrane may be degassed by providing low pressure or vacuum conditions on each side. Then a gas at a known pressure and at room temperature is introduced to one side of a silicone rubber membrane while the low pressure side leads to a McLeod gage where a pressure rise indicates permeation rate. For gas mixture, the low pressure side may be connected to a mass spectrometer where the gas is analyzed and the rate of permeation measured.

As a further example of methods and apparatus utilized to measure gas permeability through thin membranes, reference is made to the article "Gas Permeability of Plastics" in the publication entitled "Modern Plastics," Technical Section, July 1962, pages 135–180. Also, U.S. Patent 2,966,235—Kammermeyer discloses the use of various silicone rubber films for other gas separations and makes reference to U.S. Patents 2,469,883—Marsden et al. and 2,460,795—Warrick.

It can be seen from the above table that the various silicone rubber membranes provide substantially different permeation rates for a number of gases, more particularly nitrogen, xenon and krypton, oxygen and water vapor. It is understood, however, that various factors such as temperature, the amount of crystallinity or other features in the silicone rubber curing process may affect permeability. There are also variances in permeability in silicone rubbers produced from different processes. These variances as mentioned are found to be of minor nature and do not affect the basic differences in permeability as set forth.

One application of this invention as before mentioned, relates to a process of removing or separating xenon and krypton from a gas mixture which includes the mentioned gases, xenon and krypton, and other gases such as nitrogen, oxygen, and hydrogen. Most of the hydrogen and oxygen of the gas mixture may be combined to form water which is easily removable from the gas. Additional $H_2$ can be added if necessary to maintain a proper stoichiometric ratio of 2 moles of $H_2$ to 1 mole of $O_2$. One well known method of forming water involves passing the gas over a suitable catalyst such as platinum for hydrogen-oxygen combination. Thereafter, the essential components of the gas mixture are xenon, krypton and nitrogen. By means of a thin film of silicone rubber utilized in a permeation process, a gas enriched in xenon and krypton (or nitrogen), may be recovered. This separation of xenon and krypton from nitrogen is based upon the discoverey that xenon and krypton have higher permeation rates through silicone rubber membranes than does nitrogen. Furthermore, the absolute permeation rates for xenon and krypton are sufficiently high so that the required membrane area is both reasonable and practical. These high permeation rates occur in spite of the fact that the atoms of xenon and krypton are as large as or larger than the molecules of nitrogen, and in spite of the fact that helium, a much smaller atom, only permeates through silicone rubber at about the same rate as nitrogen.

One exemplary apparatus in which the described practice of this invention may be carried out is illustrated in FIG. 1. Referring now to FIG. 1, there is illustrated an exemplary permeable membrane device 10 for gas separation as relating to a gas mixture consisting essentially of xenon, krypton, and nitrogen. Device 10 includes a channel or duct member 11 adapted for the passage of a gas therethrough. In duct 11 there is positioned a permeable membrane 12 of the silicone rubber of this invention. Membrane 12 is preferably quite thin because thinner films provide better results. In the practice of this invention, films of 0.001 inch thickness were employed, and tests have also been performed on films 0.0001 inch thickness. Membrane 12 rests upon a suitable perforated or porous support member 13 and thus defines an upper duct or chamber 14 through which gas mixture flows, and a lower portion of chamber 15 which is sealed from the gas flow in the upper portion of the duct, so that any gas entering chamber 15 must pass through membrane 12. The mentioned gas mixture, for example is introduced into duct 11 by suitable flow means such as a pump or compressor 16 to pass therethrough and exhaust through exit 17. In order to provide more positive permeation through permeable membrane 12, chamber 15 is connected to a suitable low pressure device, such as a vacuum pump or compressor 18. By this arrangement a measured amount of a gas passes through duct 11 over a predetermined area of permeable membrane 12 with a certain fraction of a gas permeating membrane 12 and being removed by pump 18.

Low pressure conditions in chamber 15 accelerate the permeation of gases and an enriched gas in a particular component is obtained at the compressor 18 outlet. The degree of enrichment is dependent on such variables as the amount of xenon and krypton in the gas flowing through apparatus 10, the entering gas pressure in chamber 14, and the low pressure conditions in chamber 15. More importantly, the degree of enrichment depends on the permeation rate of a given gas or gases such as xenon and krypton through the membrane relative to the permeation rate of the other gases, in the mixture, such as nitrogen. Where the permeation rate for one gas is substantially different than that of another gas, much more of the one gas flows through the membrane in the equivalent period of time.

The described process is essentially one of separating nitrogen for example from a mixture of gases including nitrogen, xenon, and krypton. As such, this process and its related apparatus may be a part of a general process which also removes other gases. These other gases may be hydrogen and oxygen, which are removed by chemical combination as described, or by a thin film permeation method because their permeation rates in silicone rubber are also less than those of xenon or krypton.

Since radioactive isotopes xenon and krypton will expose the silicone rubber film to some radiation, it is important to evaluate this feature. Silicone films have been subjected to radiation dosages of up to $10^8$ roentgens. It was found that, at this point, permeation rates are only slightly reduced and no measurable effects were found on the separation factors. Long life conditions thus appear favorable under the radiation conditions found with respect to xenon and krypton.

One preferred apparatus for the removal of nitrogen from a nitrogen, xenon, krypton gas mixture is illustrated in FIG. 2. In FIG. 2, apparatus 20 includes a plurality of the cells or units, as illustrated in FIG. 1, connected in series flow relationship, and with recycling features. More particularly, seven such cells or units denoted as 21 through 27 are serially connected to define a manifold, upper chamber 28, which may be common to all units, by means of a silicone rubber film barrier 29, and individual lower chambers 30 through 36. Chamber 28 is provided with an inlet 37 and exhaust 38. Each lower chamber is provided with an exhaust pump or compressor 39 through 45, respectively. The output of the apparatus is taken off by pump 39 exhausting from unit 30 which exhausts the gas or gases which have permeated silicone rubber barrier 29. Each succeeding pump then recycles its gas to the inlet of the preceding unit as illustrated. For example, pump 40 is recycled to the inlet of unit 21, pump 41 to unit 22, pump 42 to unit 23, etc.

A computed operation is carried on at 25° C., utilizing permeation factors of $$\frac{\text{Pr Xe}}{\text{Pr N}_2} = 7.25$$

and $$\frac{\text{Pr Kr}}{\text{Pr N}_2} = 3.5$$

for 0.001 inch thick silicone rubber film. Feed gas is 100 liters per minute of a gas mixture comprising 99% $N_2$, 0.5% Kr, and 0.5% Xe, and it is required to remove 98.5% of the Kr and Xe at 25% purity. With 100 liters per minute of feed gas entering inlet 37 at 10 atmospheres pressure, 3.9 liters per minute are taken off at pump exit 39. This concentrate comprises 12.6% Kr, 12.7% Xe and 74.7% $N_2$. The exhaust from exit end 38 is greater than about 99.98% $N_2$. About 60 sq. yds. of membrane are required.

As a part of the described process, nitrogen or a gas considerably enriched in nitrogen, is provided. Reference to Table 1 also indicates that nitrogen separation from air is also satisfactorily attainable. There are various needs for a nitrogen gas generator which is of simple construction and operation, which is not required to produce nitrogen of high purity, and which requires little attention. One such need is in connection with fire and explosion hazards, for example, where considerable amounts of inflammable materials, fuels, ammunition, etc., are stored. These storage areas may be on land, at sea, or in remote locations.

A simple cell which may be utilized to recover nitrogen from air is illustrated in FIG. 3. However, those apparatuses of FIGS. 1 and 2 may also be employed. In FIG. 3, apparatus 50 includes a chamber member 51 which contains silicone rubber channels or tubes 52 which are arranged to provide a maximum amount of effective silicone rubber area in a minimum effective volume. Thus, the silicone rubber may be in the form of channels or tubes in heat exchange type structures which are folded or compacted to provide a very long or tortuous path for the gases. It is preferable to have silicone rubber films of minimum thickness, for example on the order of 0.001 inch thick or less, and which are suitably supported on a perforated or porous surface. The entering gas mixture is caused to flow through the silicone rubber film channels 52 by means of a pump or compressor 53. That portion of the chamber 51 which surrounds the silicone rubber tubes or channels 52 is placed under low pressure or evacuated by means of a pump or compressor 54. With air as the entering gas, oxygen, $CO_2$, argon, and water vapor all permeate the silicone rubber channel surfaces more quickly than nitrogen so that a gas enriched in nitrogen is provided at the outlet 55 of chamber 51 to be conducted to enclosure 56 to provide a constant nitrogen-rich environment therein.

Other apparatus will perform the separation as described. For example, referring to FIG. 4, a concentric tube apparatus 60 is illustrated. Apparatus 60 includes a central silicone rubber channel or tube member 61 and an outer tube or channel member 62. Channel member 62 is sealed at its ends to provide a chamber, about inner tube member 61, which is evacuated by means of a pump or compressor 63. As a gas mixture flows through inner tube member 61, constituents thereof permeate tube member 61 and are removed from chamber 62 by means of pump 63. For example, if one liter per minute of 97.5% nitrogen were desired to be removed from air passing through the apparatus of FIG. 4 (also FIGS. 1 and 2) about 10 liters per minute of air would be required to enter the apparatus with exposure to about 18½ sq. yds. of silicone rubber film. The power consumption for this operation is about 110 watts. If chamber 62 included a plurality of axially separate chambers, their products could be recycled into the inner tube member 61 for greater nitrogen recovery.

The process of this invention may be practiced with the described apparatus with specific advantages. The apparatus is simple to operate, economical, and requires little supervision. No chemicals are employed and any errors associated therewith are avoided. The process and apparatus are essentially safe in that no highly enriched oxygen is produced. Furthermore, the gas produced may be of very low humidity to reduce corrosion.

Other uses for this invention as described may be that of providing an oxygen enriched gas, for example from air, or as a dehumidifier because of the very large permeability factor relative to water vapor.

While specific methods in accordance with this invention are described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A method of providing a nitrogen atmosphere as a protective environment about inflammable and explosive materials contained in an enclosure comprising, providing a gas separation apparatus in communication with said enclosure a thin film of silicone rubber, bringing ambient air into contact with one side of said film, applying a pressure differential to cause a portion of the air to permeate through said film, and conducting nitrogen enriched gas from the said one side of said film into said enclosure.

2. A method for separating xenon and krypton from a gas mixture consisting essentially of nitrogen, xenon and krypton comprising the steps of: bringing the mixture into contact with one side of a thin, non-porous silicone rubber membrane, causing a portion of the mixture to permeate through said membrane and removing the gas mixture enriched to a substantial degree in xenon and krypton from the opposite side of said membrane.

3. The method substantially as recited in claim 2 wherein the initial gas mixture contains radioactive isotopes of xenon and krypton.

4. The method substantially as recited in claim 2 wherein the concentration of xenon and krypton in the enriched product has been increased at least tenfold.

References Cited by the Examiner

UNITED STATES PATENTS

| | | | |
|---|---|---|---|
| 366,081 | 7/1887 | Edgerton | 55—16 |
| 2,452,066 | 10/1948 | Murphy | 55—158 X |
| 2,540,152 | 2/1951 | Weller | 55—16 |
| 2,609,059 | 9/1952 | Benedict | 55—16 |
| 2,617,493 | 11/1952 | Jones | 55—16 |
| 2,627,933 | 2/1953 | Teter | 55—158 |
| 2,862,575 | 12/1958 | Birdwhitsell et al. | 55—16 |
| 2,893,512 | 7/1959 | Armond | 55—66 X |
| 2,911,057 | 11/1959 | Green et al. | 55—158 |
| 2,966,235 | 12/1960 | Kammermeyer | 55—16 |
| 2,981,680 | 4/1961 | Binning | 55—16 X |
| 3,063,217 | 11/1962 | Armond et al. | 55—66 X |

FOREIGN PATENTS

| | | |
|---|---|---|
| 222,327 | 6/1959 | Australia. |
| 1,257,087 | 2/1961 | France. |
| 795,210 | 5/1958 | Great Britain. |
| 866,043 | 1/1962 | Great Britain. |
| 568,443 | 10/1957 | Italy. |

OTHER REFERENCES

Major et al., "Gas Permeability of Plastics," Modern Plastics, Breskin Publications Inc., 770 Lexington Ave., New York 21, N.Y., vol. 39, No. 11, July 1962, pp. 135, 138, 140, 142, 145, 146, 179, 180.

REUBEN FRIEDMAN, *Primary Examiner.*

J. ADEE, D. TALBERT, *Assistant Examiners.*